United States Patent
Lian et al.

(10) Patent No.: US 10,322,718 B2
(45) Date of Patent: Jun. 18, 2019

(54) VEHICLE STABILITY CONTROL METHOD AND SYSTEM, AND VEHICLE

(71) Applicant: BYD COMPANY LIMITED, Shenzhen, Guangdong (CN)

(72) Inventors: Yubo Lian, Shenzhen (CN); Heping Ling, Shenzhen (CN); Ning Wang, Shenzhen (CN); Yanfei Xiong, Shenzhen (CN); Ting Wen, Shenzhen (CN)

(73) Assignee: BYD COMPANY LIMITED (CN)

( * ) Notice: Subject to any disclaimer, the term of this patent is extended or adjusted under 35 U.S.C. 154(b) by 0 days.

(21) Appl. No.: 15/753,105

(22) PCT Filed: Aug. 18, 2016

(86) PCT No.: PCT/CN2016/095889
§ 371 (c)(1),
(2) Date: Feb. 15, 2018

(87) PCT Pub. No.: WO2017/028800
PCT Pub. Date: Feb. 23, 2017

(65) Prior Publication Data
US 2018/0237001 A1    Aug. 23, 2018

(30) Foreign Application Priority Data

Aug. 20, 2015   (CN) .......................... 2015 1 0516313

(51) Int. Cl.
*B60K 7/00*   (2006.01)
*B60W 10/08*  (2006.01)
(Continued)

(52) U.S. Cl.
CPC ........... *B60W 30/02* (2013.01); *B60K 7/0007* (2013.01); *B60K 17/356* (2013.01);
(Continued)

(58) Field of Classification Search
CPC ................ B60K 17/043; B60K 17/356; B60K 2007/0092; B60K 7/0007; B60L 15/32;
(Continued)

(56) References Cited

U.S. PATENT DOCUMENTS 5,696,681 A   12/1997  Davorin et al.
5,934,768 A    8/1999  Katsuya
(Continued)

FOREIGN PATENT DOCUMENTS

CN         1522910      8/2004
CN       101311050     11/2008
(Continued)

OTHER PUBLICATIONS

English Translation of International Search Report from PCT/CN2016/095889 dated Oct. 31, 2016 (2 pages).

*Primary Examiner* — Thomas G Black
*Assistant Examiner* — Ce Li Li
(74) *Attorney, Agent, or Firm* — Calfee, Halter & Griswold LLP

(57) ABSTRACT

A vehicle stability control system includes a signal collection sensor and a vehicle controller (10). The signal collection sensor is configured to collect a vehicle condition information parameter, and the vehicle controller (10) is configured to calculate a control yaw moment according to the vehicle condition information parameter. The control yaw moment is used to cancel a difference between an estimated yaw moment and an actual yaw moment. The vehicle controller (10) is further configured to determine according to the vehicle condition information parameter whether the vehicle (100) is in a stable region or a non-stable region in the case of tire blow-out, and allocate the control yaw moment to four wheels (101) according to a vehicle stability condition, thus implementing vehicle stability con-
(Continued)

trol. A vehicle stability control method and a vehicle (100) with the vehicle stability control system are also disclosed.

20 Claims, 5 Drawing Sheets

(51) Int. Cl.
| | | |
|---|---|---|
| *B60W 10/184* | (2012.01) | |
| *B60W 30/02* | (2012.01) | |
| *B60K 17/356* | (2006.01) | |
| *B60L 3/00* | (2019.01) | |
| *B60L 3/10* | (2006.01) | |
| *B60L 7/10* | (2006.01) | |
| *B60L 7/18* | (2006.01) | |
| *B60L 11/18* | (2006.01) | |
| *B60K 17/04* | (2006.01) | |

(52) U.S. Cl.
CPC ........... *B60L 3/0076* (2013.01); *B60L 3/0092* (2013.01); *B60L 3/108* (2013.01); *B60L 7/10* (2013.01); *B60L 7/18* (2013.01); *B60L 11/18* (2013.01); *B60W 10/08* (2013.01); *B60W 10/184* (2013.01); *B60K 17/043* (2013.01); *B60K 2007/0092* (2013.01); *B60L 2220/42* (2013.01); *B60L 2220/46* (2013.01); *B60L 2240/16* (2013.01); *B60L 2240/18* (2013.01); *B60L 2240/22* (2013.01); *B60L 2240/24* (2013.01); *B60L 2260/28* (2013.01); *B60W 2510/20* (2013.01); *B60W 2520/105* (2013.01); *B60W 2520/125* (2013.01); *B60W 2520/14* (2013.01); *B60W 2520/26* (2013.01); *B60W 2520/28* (2013.01); *B60W 2530/20* (2013.01); *B60W 2540/18* (2013.01); *B60W 2710/083* (2013.01); *B60W 2720/14* (2013.01); *B60Y 2200/91* (2013.01)

(58) Field of Classification Search
CPC ............. B60T 2201/14; B60T 2230/02; B60T 2270/86; B60T 8/17552; B60T 8/1769; B60W 10/08; B60W 10/184; B60W 2050/0028; B60W 2510/20; B60W 2520/105; B60W 2520/125; B60W 2520/14; B60W 2520/26; B60W 2520/28; B60W 2530/20; B60W 2540/18; B60W 2710/083; B60W 2720/14; B60W 30/02; B60W 40/11; B60W 40/112; B60W 40/114; B60Y 2200/91

See application file for complete search history.

(56) References Cited

U.S. PATENT DOCUMENTS

| | | | |
|---|---|---|---|
| 7,137,673 B2 | 11/2006 | Sohel | |
| 7,561,951 B2* | 7/2009 | Rao | ................ B60W 50/0205 |
| | | | 180/268 |
| 7,677,095 B1* | 3/2010 | Bartol | ................... B60T 8/1725 |
| | | | 73/146.2 |
| 8,355,844 B2 | 1/2013 | Ryoji et al. | |
| 2002/0109402 A1* | 8/2002 | Nakamura | .......... B60T 8/17552 |
| | | | 303/146 |
| 2005/0080546 A1* | 4/2005 | Milot | ...................... B60C 23/00 |
| | | | 701/70 |
| 2006/0108863 A1 | 5/2006 | Ralph et al. | |
| 2006/0111829 A1* | 5/2006 | Williams | ................ B60C 23/04 |
| | | | 701/79 |
| 2006/0253240 A1* | 11/2006 | Rao | ................... B60W 50/0205 |
| | | | 701/48 |
| 2008/0086251 A1* | 4/2008 | Lu | ........................ B60T 8/1755 |
| | | | 701/70 |
| 2011/0307129 A1 | 12/2011 | Hai et al. | |
| 2012/0179349 A1* | 7/2012 | Yamakado | ............ B60T 8/1755 |
| | | | 701/89 |
| 2013/0030601 A1 | 1/2013 | Sangyon | |
| 2017/0137023 A1* | 5/2017 | Anderson | .......... B60G 17/0195 |

FOREIGN PATENT DOCUMENTS

| | | | |
|---|---|---|---|
| CN | 101374711 | | 2/2009 |
| CN | 101374711 A | | 2/2009 |
| CN | 102765386 A | | 11/2012 |
| CN | 103182956 A | | 7/2013 |
| CN | 103935265 A | | 7/2014 |
| CN | 204057064 A | | 12/2014 |
| CN | 104786804 A | | 7/2015 |
| CN | 104787039 A | | 7/2015 |
| DE | 10357254 A | | 6/2005 |
| DE | 10357254 A1 | | 6/2005 |
| DE | 102008024294 A1 | | 11/2009 |
| EP | 1207090 A2 | | 5/2002 |
| JP | 2011067076 A | | 3/2011 |
| JP | 2015074421 A | | 4/2015 |
| KR | 20130026328 A | * | 3/2013 |
| KR | 20130026328 A | | 3/2013 |

\* cited by examiner

VEHICLE STABILITY CONTROL METHOD AND SYSTEM, AND VEHICLE

CROSS-REFERENCE TO RELATED APPLICATIONS

This application is based on International Application No. PCT/CN 2016/095889, filed on Aug. 18, 2016, which claims priority and benefits of Chinese Patent Application No. 201510516313.7, filed with State Intellectual Property Office, P. R. C. on Aug. 20, 2015, the entire contents of which are incorporated herein by reference.

TECHNICAL FIELD

The present invention relates to vehicles, and in particular, to a vehicle stability control method and system, and a vehicle.

RELATED ART

One existing vehicle tire blow-out security and stability control system controls a steering related brake adjustor to output unbalanced braking forces and moments to some wheels according to a tire blow-out signal, a steering wheel angle signal and the like, so as to generate a yaw moment that recovers stability of a vehicle after tire blow-out, and a pedal brake allocation adjustor re-allocates braking forces output for wheels by a pedal brake apparatus, which makes the vehicle obtain balanced braking forces and moments, or a lift suspension is started, to partially or completely recover balance of the vehicle, and implement tire blow-out security and stability control by using adhesion coefficients of the wheels after the tire blow-out to the greatest extent.

Another existing vehicle tire blow-out control method includes: collecting a tire blow-out signal and a vehicle speed signal in real time; sending a brake signal according to the collected tire blow-out signal, so as to hard brake a vehicle, and at the same time, locking a direction of the vehicle when the vehicle speed signal exceeds a preset value, which can maintain an original driving direction of the vehicle when the vehicle speed exceeds a preset security value, and the vehicle will not completely lose a capability to change the direction.

In the above system and method, a hydraulic brake system is essential, and an antilock brake system (ABS) and an electronic stability program (ESP) conduct hydraulic brake on one or more wheels on the basis of hydraulic brake so as to perform yaw moment control, but hydraulic brake has disadvantages of complicated system, slow response and high cost.

Secondly, the tire blow-out lasts for a very short time, and during the tire blow-out, it is likely that the vehicle has slightly yawed, and thus it is extremely easy to endanger the vehicle if the direction of the vehicle is locked in the tire blow-out, especially during curve driving or high-speed driving.

Next, a conventional electronic stability system (including an ABS and an ESP) does not take tire characteristics of the vehicle after tire blow-out into account, and cannot effectively control a motion trajectory and a body attitude of the vehicle. After tire blow-out, the mass center of the vehicle transfers to a blown-out wheel, the load of a diagonal tire decreases, the adhesive force that the tire with the decreasing load can use also decreases, while tires with increasing load cannot make full use of the adhesive force, resulting in that conventional electronic stability control cannot produce a sufficient control yaw moment to maintain the vehicle in a motion state before the tire blow-out, which is even counter-productive sometimes, making wheels driving in a stable region lead to instability of the vehicle due to misjudgment and intervention of the electronic stability system.

SUMMARY

The present invention seeks to at least solve one of the technical problems existing in the related art. To this end, the present invention provides a vehicle stability control system and method for a four-wheel independent drive vehicle, and a vehicle.

The vehicle stability control system in embodiments of the present invention includes:
motors coupled with four wheels of a vehicle respectively;
motor controllers connected with the motors;
an information collection module, configured to collect a vehicle condition information parameter of the vehicle; and
a vehicle controller, connected with the motor controllers and the information collection module respectively, and configured to obtain a control yaw moment according to the vehicle condition information parameter, the control yaw moment being equal to a yaw moment difference between an estimated yaw moment and an actual yaw moment of the vehicle;
wherein the vehicle controller is further configured to determine according to the vehicle condition information parameter whether the vehicle is in a stable region in the case of tire blow-out;
the vehicle controller is further configured to implement brake control on the motor corresponding to the wheel on the other side coaxial with the wheel with tire blow-out when the vehicle is in the stable region, so as to produce the control yaw moment; and
the vehicle controller is further configured to implement drive control on the motor corresponding to the wheel with tire blow-out and implement brake control on the motor corresponding to at least one of the other three wheels when the vehicle is in a non-stable region, so as to produce the control yaw moment.

The vehicle in embodiments of the present invention includes:
four wheels; and
the vehicle stability control system described above.

The vehicle stability control method in embodiments of the present invention includes:
collecting a vehicle condition information parameter of a vehicle;
obtaining a control yaw moment according to the vehicle condition information parameter of the vehicle, wherein the control yaw moment is equal to a yaw moment difference between an estimated yaw moment and an actual yaw moment of the vehicle;
determining whether the vehicle is in a stable region in the case of tire blow-out according to the vehicle condition information parameter;
if the vehicle is in the stable region, implementing brake control on a motor corresponding to a wheel on the other side coaxial with a wheel with tire blow-out so as to produce the control yaw moment; and
if the vehicle is in a non-stable region, implementing drive control on a motor corresponding to the wheel with tire blow-out and implementing brake control on a motor corresponding to at least one of other three wheels, so as to produce the control yaw moment.

The vehicle stability control method and system in embodiments of the present invention use rapid response and regenerative brake characteristics of the motor to replace a hydraulic brake system with complicated system, slow response and high cost, thus achieving simplifying the system, making rapid response and reducing the cost.

Additional aspects and advantages of the present invention will be given in part in the following descriptions, become apparent in part from the following descriptions, or be learned from the practice of the present invention.

BRIEF DESCRIPTION OF THE DRAWINGS

These and other aspects and advantages of the present invention will become apparent and more readily appreciated from the following descriptions made with reference to the drawings, in which.

DETAILED DESCRIPTION

Figure 1:
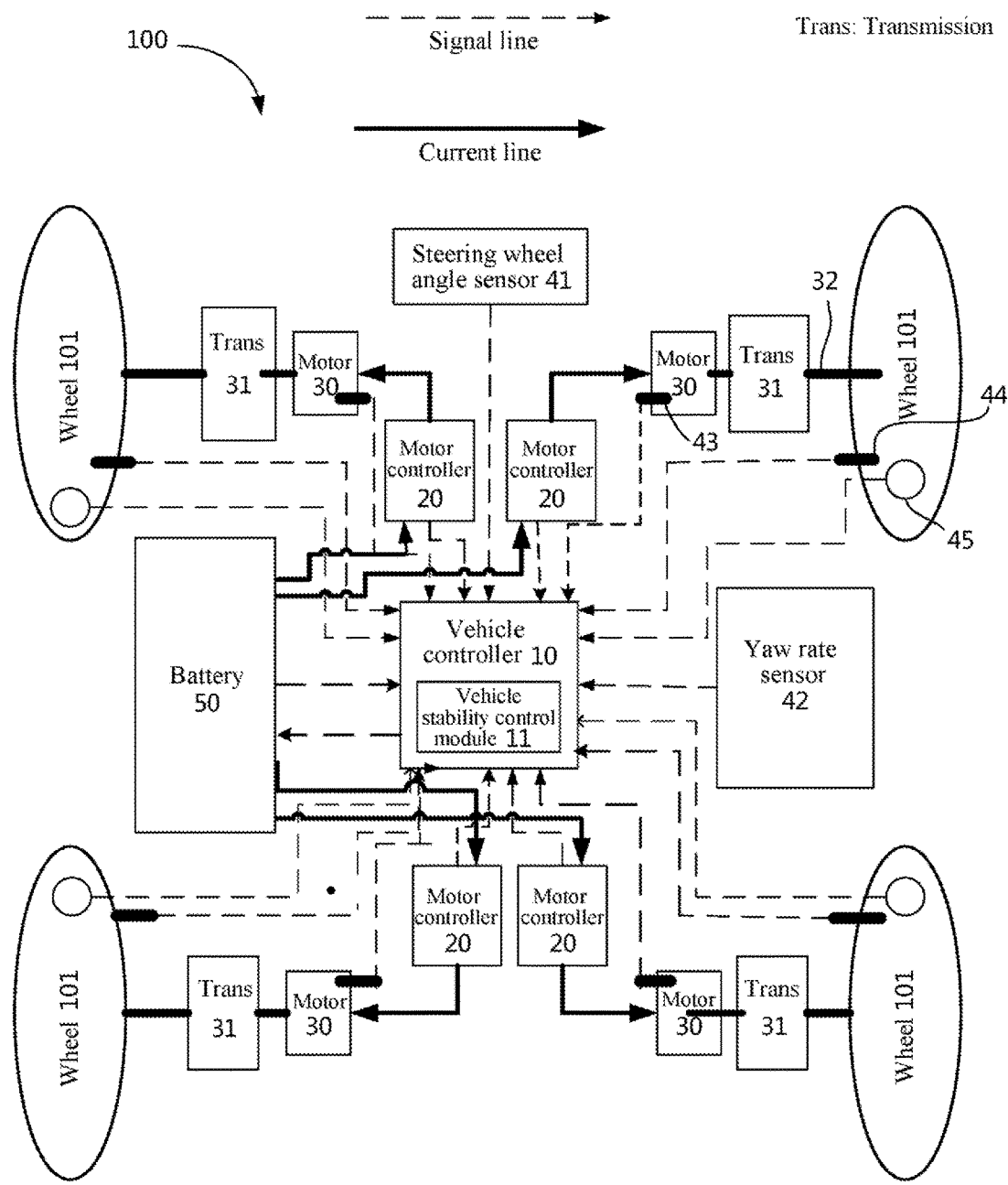
FIG. 1 is a schematic diagram of functional modules of a vehicle to which a vehicle stability control method and system for a four-wheel independent drive vehicle according to an embodiment of the present invention are applied.

Embodiments of the present invention will be described in detail below. Examples of the embodiments are illustrated in the drawings, in which the same or similar elements and the elements having same or similar functions are denoted by like reference numerals. The embodiments described herein with reference to drawings are explanatory, illustrative, and should be used to generally understand the present invention. The embodiments shall not be construed to limit the present invention.

In the description of the present invention, it should be understood that, terms such as "first" and "second" are used herein for purposes of description and are not intended to indicate or imply relative importance or significance or to imply the number of indicated technical features. Thus, the feature defined with "first" and "second" may include one or more of this feature. In the description of the present invention, "a plurality of" means two or more than two, unless specified otherwise.

In the description of the present invention, it should be understood that, unless specified or limited otherwise, the terms "mounted," "connected," and "coupled" should be understood broadly, for example, which may be fixed connections, detachable connections or integral connections; may be mechanical connections, electrical connections or mutual communication; may be direct connections, indirectly connected with each other through an intermediate medium, or communications inside two elements or an interaction relationship of two elements. Those of ordinary skill in the art can understand specific meanings of the terms in the present invention according to specific situations.

The disclosure hereinafter provides lots of different embodiments or examples to achieve different structures of the present invention. In order to simplify the disclosure of the present invention, components and settings of specific examples are described hereinafter. Certainly, they are merely examples, and are not intended to limit the present invention. In addition, the present invention can repeat reference numbers and/or reference letters in different examples, but such repetitions are for simplification and clarity, which do not indicate relationships between the embodiments and/or settings discussed. In addition, the present invention provides examples of various specific processes and materials, but those of ordinary skill in the art can realize applications of other processes and/or use of other materials.

Referring to FIG. 1, it illustrates a four-wheel independent drive vehicle 100 to which a vehicle stability control method and system according to embodiments of the present invention can be applied. The vehicle 100 includes four wheels 101, including a left front wheel and a right front wheel connected through a front shaft and a left rear wheel and a right rear wheel connected through a rear shaft, and each wheel 101 includes a hub and a tire sleeved over the hub.

In this embodiment, the vehicle stability control system includes a signal collection sensor (not shown), a vehicle controller 10, a motor controller 20 and a motor 30. In this embodiment, the signal collection sensor, the vehicle controller 10 and the motor controller 20 can conduct communication through a controller area network (CAN) bus of the vehicle. The motor controller 20 and the motor 30 are connected through a current line.

Corresponding to the four wheels 101, the vehicle 100 includes four motor controllers 20 and four motors 30. Each motor controller 20 is configured to independently control the corresponding motor 30 to operate. Each motor 30 is configured to independently drive or perform regenerative brake on the corresponding wheel 101, for example, the motor 30 applies a forward torque or a reverse torque to the wheel 101 for producing a driving force or a braking force. Specifically, in this embodiment, the motor 30 is a wheel-side motor or a hub motor, and correspondingly, the vehicle 100 further includes four transmissions 31 and four transmission shafts 32, and each motor 30 is connected to the corresponding wheel 101 through the corresponding transmission 31 and transmission shaft 32. Thus, the vehicle 100 can implement four-wheel independent drive.

The signal collection sensor is configured to collect a vehicle condition information parameter, the vehicle condition information parameter including a steering wheel angle, a yaw velocity, a lateral acceleration, a longitudinal acceleration, a wheel speed and a tire pressure.

In this embodiment, the signal collection sensor includes a steering wheel angle sensor 41, a yaw rate sensor 42, a rotational change sensor 43 disposed on each motor 30, a wheel speed sensor 44 disposed on each wheel 101 and a tire pressure sensor 45. The steering wheel angle sensor 41 is configured to collect a steering wheel angle. The yaw rate sensor 42 may include a longitudinal acceleration sensor, a lateral acceleration sensor and a yaw velocity sensor. The yaw velocity sensor is configured to collect a yaw velocity. The longitudinal acceleration sensor is configured to collect a longitudinal acceleration, and the lateral acceleration sensor is configured to collect a lateral acceleration. The rotational change sensor 43 is configured to collect a rotational change speed of the corresponding motor 30, that is, the rotational speed of the motor. The wheel speed sensor 44 is configured to collect a rotational speed of the corresponding wheel 101, that is, the wheel speed. It can be understood that both the rotational change sensor 43 and the wheel speed sensor 44 can collect the wheel speed, and thus both can be used as wheel speed sensors. The tire pressure sensor 45 is configured to collect a tire pressure of the tire of the wheel 101.

In addition, as part of the signal collector, the motor controller 20 further feeds back a driving capability of the motor 30 through the CAN bus.

Moreover, the vehicle 100 includes a battery 50, and the battery 50 is connected with the vehicle controller 10 and feeds back a charge condition of the battery 50 through the CAN bus, which is also a vehicle condition information parameter. In addition, the battery 50 is further connected with the motor controller 20 through a current line, to provide power.

Thus, the vehicle controller 10 can obtain the vehicle condition information parameter through the CAN bus. For example, the vehicle controller 10 obtains a tire condition and cornering stiffness of the front shaft and the rear shaft according to the tire pressure of the tire fed back by the tire pressure sensor 45, and determines whether tire blow-out occurs in the vehicle 100 according to the tire pressure of the tire.

The vehicle controller 10 is responsible for controlling operations of the vehicle 100, and may include a vehicle stability control module 11. The vehicle stability control module 11 is configured to calculate a control yaw moment, and to drive or brake the four wheels 101 independently according to the control yaw moment, thus achieving vehicle stability. The control yaw moment is equal to a yaw moment difference between an estimated yaw moment and an actual yaw moment of the vehicle, and is used to cancel the yaw moment difference.

It can be understood that, in addition to the vehicle stability control module 11, the vehicle controller 10 may further include other control modules configured to implement other functions of the vehicle 100.

Figure 2:
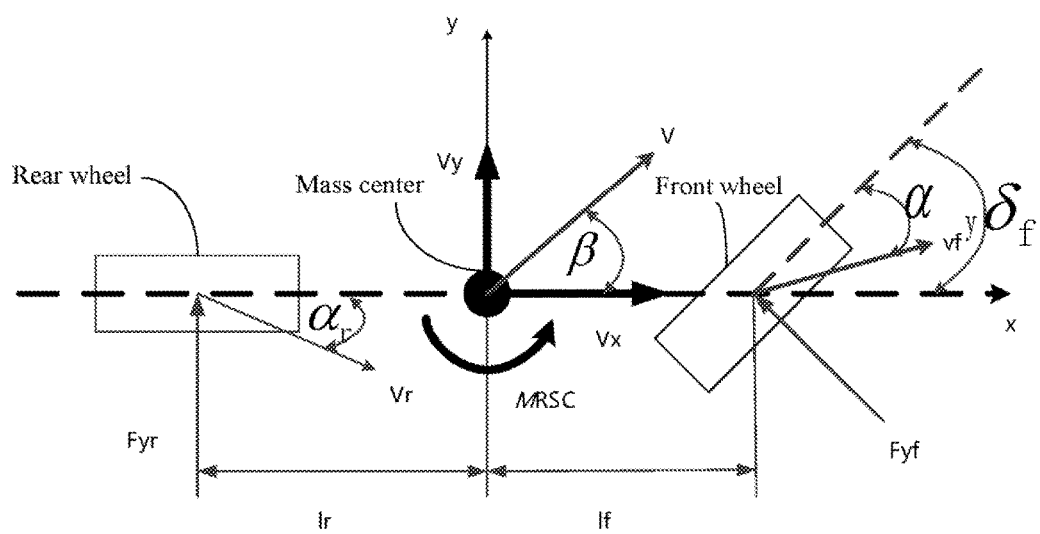
FIG. 2 is a schematic diagram of a two-degree-of-freedom vehicle model of a vehicle.

In this embodiment, referring to FIG. 2, it can be known from a dynamics equation of a two-degree-of-freedom vehicle model obtained according to Newton's Laws:

$$M_{RSC} = -l_f F_{yf} \cos \delta_f + l_r F_{yr} + I_z(\dot{\gamma}_d - \zeta(\dot{\beta} - \dot{\beta}_d)).$$

$M_{RSC}$ is the control yaw moment. For a vehicle driving straightly, the estimated yaw moment is zero, and the actual yaw moment is $M_{RSC}$.

$l_f$ and $l_r$ are distances from a front shaft and a rear shaft of the vehicle 100 to the mass center of the vehicle 100 respectively, which are determined during design and manufacturing of the vehicle 100 and can be stored in the vehicle controller 10.

$F_{yf}$ and $F_{yr}$ are lateral forces applied to front wheels (the left front wheel and the right front wheel) and rear wheels (the left rear wheel and the right rear wheel) of the vehicle 100 respectively, which can be obtained through the following dynamics equations:

$$F_{yf} = k_f \alpha_f = k_f \left( \delta_f - \frac{v_y - l_f \gamma}{v_x} \right); \text{ and}$$

$$F_{yr} = k_r \alpha_r = k_r \left( \delta_r - \frac{v_y - l_r \gamma}{v_x} \right).$$

$k_f$ and $k_r$ are cornering stiffness of the front shaft and the rear shaft of the vehicle 100 respectively, which can be deduced from tire pressures of tires of the four wheels 101 fed back by the tire pressure sensor 45.

$\alpha_f$ and $\alpha_r$ are accelerations of the front wheels and the rear wheels of the vehicle 100 respectively, which can be collected and fed back by the yaw rate sensor 42.

$\delta_f$ and $\delta_r$ are turning angles of the front wheels and the rear wheels of the vehicle 100 respectively, which can be deduced from the steering wheel angle fed back by the steering wheel angle sensor 41.

$v_x$ and $v_y$ are transverse speed and longitudinal speed of the vehicle 100 respectively, which can be deduced from the rotational change speed fed back by the rotational change sensor 43 or the wheel speed fed back by the wheel speed sensor 44.

$\gamma$ is the yaw velocity, which can be collected by the yaw rate sensor 42.

$I_z$ is moment of inertia of the vehicle 100 around the axis Z, which can be measured during manufacturing of the vehicle 100 and stored in the vehicle controller 10.

$\gamma_d$ is a derivative of an estimated yaw velocity, that is, an estimated yaw acceleration, and $$\gamma_d = \frac{\delta_r * v_x / L}{1 + K * v_x^2};$$

where L is a distance between the front shaft and the rear shaft of the vehicle 100, that is, wheelbase, which is determined during manufacturing of the vehicle 100 and is stored in the vehicle controller 10.

K is a stability factor, which is specifically:

$$K = \frac{m}{L^2} \left( \frac{l_f}{k_r} - \frac{l_r}{k_f} \right),$$

where m is the mass of the vehicle 100, which is determined during manufacturing of the vehicle 100 and is stored in the vehicle controller 10.

$\zeta$ is a constant.

$\dot{\beta}$ is a derivative of a sideslip angle, and $\dot{\beta}$ can be deduced from the speed, the lateral speed or transverse speed collected by the wheel speed sensor 44.

$\dot{\beta}_d$ is a derivative of an estimated sideslip angle, and $$\dot{\beta}_d = \frac{l_r - m * l_f * v_x^2 / (k_r * L)}{L(1 + K v_x^2)} \delta_f.$$

To sum up, the vehicle controller 10 can calculate the control yaw moment $M_{RSC}$ according to the vehicle condition information parameter collected by the signal collection sensor.

The vehicle stability control module 11 performs certain control logic to determine how much drive force or brake force should be applied to the four wheels 101 respectively for producing the control yaw moment $M_{RSC}$, after calculating the control yaw moment $M_{RSC}$. In this process, the vehicle stability control module 11 further needs to take the tire condition of the wheel 101 into account, for example, whether the tire is blown out, the driving capability of the motor 30, for example, whether the motor 30 fails, and a charge condition of the battery 50, for example, whether the battery 50 has sufficient power to achieve vehicle stability.

While the vehicle stability control module 11 implements control, the signal collection sensor still collects the vehicle condition information parameter in real time, and the vehicle stability control module 11 also updates the calculated control yaw moment $M_{RSC}$ in real time according to the vehicle condition information parameter obtained in real time, and adjusts drive or regenerative brake on the four wheels 101 according to the updated control yaw moment $M_{RSC}$. Therefore, the vehicle stability system in the embodiment of the present invention is a closed-loop system, so that vehicle stability can be effectively ensured.

If tire blow-out occurs, the tire blow-out generally only lasts for about 0.1 s. After the tire blow-out, there will be following problems: 1. a rolling resistance coefficient of the blown-out tire increases to about 21 times the normal value, rolling resistance increases rapidly, and the vehicle is easy to yaw if a yaw torque is added instantaneously; 2. radial stiffness of the blown-out tire is decreased to be about 1/13 of the original one, the tire body is recessed in a short time, the center of gravity of the vehicle body transfers, vertical load of the blown-out wheel increases, vertical load of a diagonal wheel of the blown-out wheel correspondingly decreases, the vehicle body tilts, and it is necessary to apply a greater brake moment to the diagonal wheel of the blown-out wheel so as to overcome a yaw torque caused by the blown-out tire; however, the vertical load of the diagonal wheel decreases, the corresponding available ground adhesive force is reduced, and thus the brake torque of the diagonal wheel is insufficient to overcome the yaw torque caused by the blown-out tire, and it is necessary to auxiliarily brake other wheels; 3. cornering stiffness of the blown-out tire is decreased to about 37.63% of the normal value, and further, according to the theory of "adhesive ellipse", if the original drive is continuously maintained or sudden brake is applied after the tire blow-out, a lateral available adhesive force of the blown-out wheel is small, plus decrease of the cornering stiffness of the blown-out wheel, it is extremely easy to cause sideslip of the blown-out wheel, the vehicle is uncontrollable, and thus it is necessary to adjust the driving torque of the blown-out wheel after the tire blow-out, letting the size thereof balanced with the instantaneously increasing rolling resistance, that is, the sizes are equal, and the directions are opposite, making the longitudinal resultant force be zero, and trying to improve lateral adhesion performance of the blown-out wheel; 4. longitudinal slip stiffness of the blown-out tire is reduced to about 43.28% of the normal value, it is easy for the blown-out tire to slip longitudinally, and it is necessary to reduce the torque value of the blown-out wheel; 5. roll stiffness of the blown-out tire is reduced to about 40.43% of the roll stiffness of the normal tire, the vehicle body is easy to tilt after the tire blow-out, and there is a risk of rolling over at a high speed; an effective rolling radius of the blown-out tire is reduced to 80% of the original one, and at the same rotational speed, the distance which the blown-out wheel drives is small, leading to yaw.

Therefore, the vehicle stability control module 11 needs to determine, in real time, whether tire blow-out occurs in the vehicle 100 according to the information parameter collected by the tire pressure sensor 45. Specifically, if the tire blow-out occurs, the vehicle stability control module 11 needs to calculate a yaw velocity difference $\Delta\gamma$ between an estimated yaw velocity $\gamma_d$ and an actual yaw velocity $\gamma$ and a sideslip angle $\beta$ according to the vehicle condition information parameter, and allocates the control yaw moment $M_{RSC}$ to the four wheels 101 according to the yaw velocity difference $\Delta\gamma$ and the sideslip angle $\beta$.

For example, when the tire blow-out has just happened, the yaw velocity difference $\Delta\gamma$ and the sideslip angle $\beta$ are relatively small ($\Delta\gamma \leq \gamma1$ and $\beta \leq \beta1$ are satisfied, where $\gamma1$ is a threshold of the yaw velocity difference and $\beta1$ is a threshold of the sideslip angle), and the vehicle 100 is in a stable region. At this point, the motor 30 of the wheel 101 on the other side coaxial with the blown-out wheel 101 needs to respond and implements brake control on the wheel 101 on the other side coaxial with the blown-out wheel 101, thus balancing the yaw moment difference generated at the beginning of the tire blow-out, and restraining the tendency that the vehicle develops towards a non-stable region.

When $\Delta\gamma \geq \gamma1$ or $\beta \geq \beta1$, it indicates that the vehicle 100 is going to enter the non-stable region, the vehicle stability control module 11 sends a stronger control instruction, and will first send a control instruction of controlling drive to the blown-out wheel 101, for balancing the increasing rolling resistance due to tire blow-out in the shortest time, and preventing the blown-out wheel 101 from sideslip.

At the same time, brake control is implemented on the other three wheels 101 according to the control yaw moment. For example, the regenerative brake is performed on the diagonal wheel 101, and if the diagonal wheel 101 is insufficient to provide the control yaw moment, it is also necessary to perform regenerative brake (auxiliary brake) on the other two wheels 101, for making the vehicle 100 rapidly enter the stable region to drive, that is, $\Delta\gamma \leq \gamma1$ and $\beta \leq \beta1$.

After reaching the stable region, in order to avoid that speed reduction due to regenerative braking leads to rear-end collision, the vehicle stability control module 11 adjusts the non-blown-out wheel 101 according to the control yaw moment $M_{RSC}$, for example, removes the regenerative braking, to maintain the vehicle at a fixed speed to drive stably.

Figure 3:
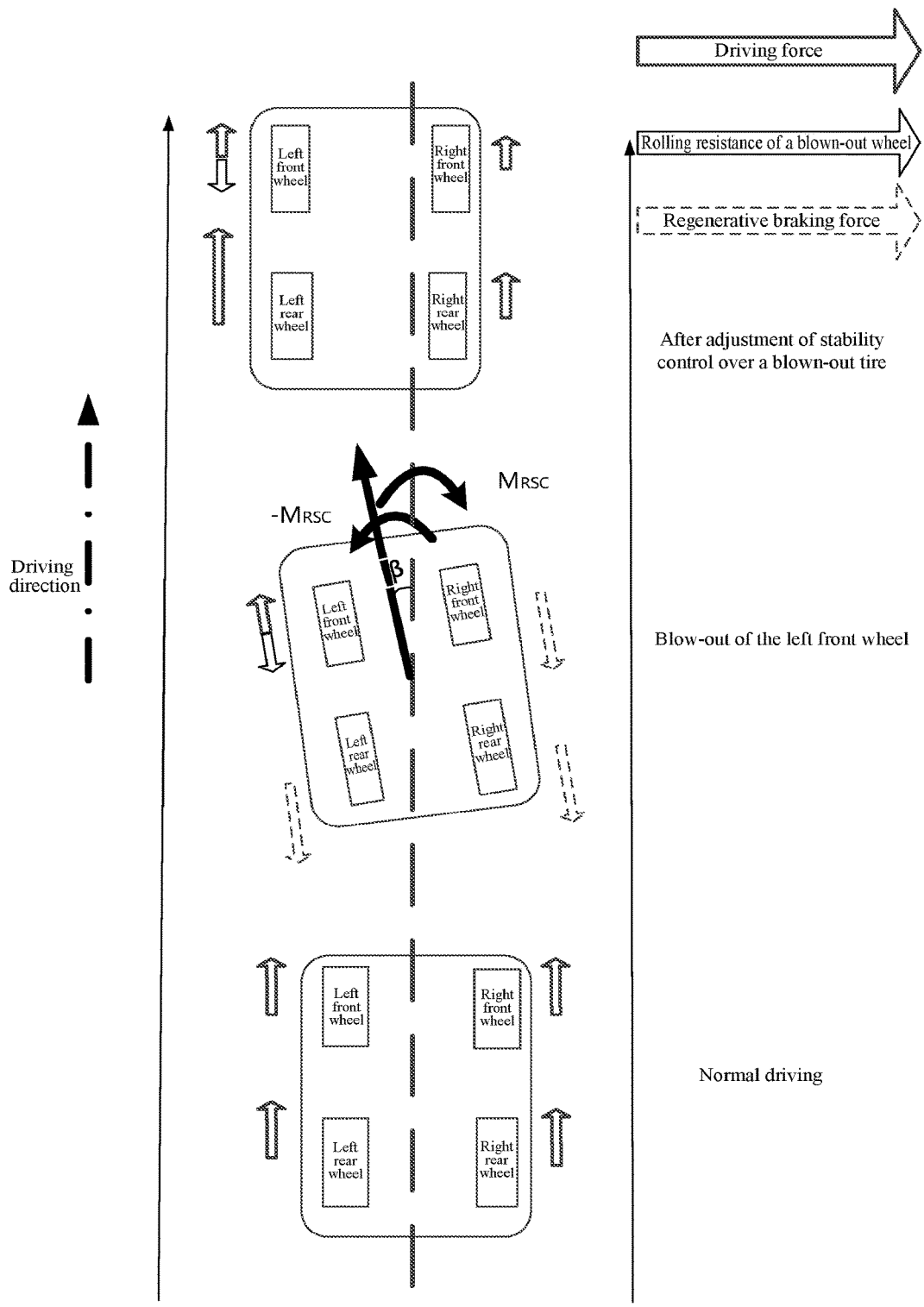
FIG. 3 is a schematic diagram of an application of a vehicle stability control method and system for a four-wheel independent drive vehicle according to an embodiment of the present invention.

Referring to FIG. 3, as one example, during driving of the vehicle 100, the left front wheel suddenly blows out, a tire blow-out signal is transferred to the vehicle controller 10. At the same time, the vehicle controller 10 calculates, in real time, an estimated yaw velocity $\gamma_d$ of the vehicle 100 according to the vehicle condition information parameters collected by the steering wheel angle sensor 41, the wheel speed sensor 44 and the tire pressure sensor 45, compares the estimated yaw velocity $\gamma_d$ with the yaw velocity $\gamma$ measured by the yaw rate sensor 42 to obtain the yaw velocity difference $\Delta\gamma$, and further, estimates a sideslip angle $\beta$ according to the vehicle condition information parameter collected by the wheel speed sensor 44, and calculates the control yaw moment $M_{RSC}$ used to cancel the yaw moment difference between the estimated yaw moment and the actual yaw moment in real time by using the moment of inertia $I_z$. The vehicle stability control module 11 sets the threshold $\gamma1$ of the yaw velocity difference and the threshold $\beta1$ of the sideslip angle. When the tire blow-out has just happened, $\Delta\gamma$ and $\beta$ are relatively small, that is, $\Delta\gamma \leq \gamma1$ and $\beta \leq \beta1$ are satisfied, the vehicle 100 is in the stable region, the motor 30 of the right front wheel needs to respond and implements brake control on the right front wheel coaxial with the blown-out wheel 101, for balancing the yaw moment difference generated at the beginning of the tire blow-out, and restraining the tendency that the vehicle 100 develops towards a non-stable region. However, if the tendency cannot be restrained, and $\Delta\gamma \geq \gamma1$ or $\beta \geq \beta1$ is satisfied, it indicates that the vehicle 100 is going to enter the non-stable region, the vehicle controller 10 sends a stronger control instruction, and will first send a control instruction of controlling drive to the left front wheel, for balancing the increasing rolling resistance due to tire blow-out in the shortest time, and preventing the blown-out wheel 101 from sideslip, and moreover, available yaw moments of the other three wheels 101 in the current vehicle state are calculated according to the vehicle dynamics model and the tire model, to implement brake control. For example, brake control is implemented on the right rear wheel, and if the right rear wheel is insufficient to provide a corresponding control yaw moment, it is also necessary to auxiliarily brake the right front wheel and the left rear wheel, making the vehicle 100 rapidly enter the stable region to drive, that is, $\Delta\gamma \leq \gamma 1$ and $\beta \leq \beta 1$. After reaching the stable region, in order to avoid that speed reduction due to braking leads to rear-end collision, the vehicle controller 10 needs to make further analysis to further adjust the torque of the non-blown-out wheel, maintaining the vehicle to stably drive at a fixed speed. As shown in FIG. 3, during straight driving of the vehicle, influences of a steering system on the vehicle are not considered. After tire blow-out occurs in the left front wheel, the vehicle produces a yaw moment—$M_{RSC}$ caused by tire blow-out of the left front wheel, which is specifically a yaw moment difference between an estimated yaw moment and an actual yaw moment, the direction thereof is a counterclockwise direction, and at least one of the motors corresponding to the remaining three wheels produces a control yaw moment $M_{RSC}$, the direction of which is a clockwise direction, used to balance the yaw moment—$M_{RSC}$ caused by tire blow-out of the left front wheel. For example, when the vehicle is in a stable region after tire blow-out occurs in the left front wheel, the vehicle produces a yaw moment—$M_{RSC}$ caused by tire blow-out of the left front wheel, the direction thereof is a counterclockwise direction, the motor 30 of the right front wheel implements brake control on the right front wheel coaxial with the blown-out wheel 101 to produce a control yaw moment $M_{RSC}$, and the direction thereof is a clockwise direction, to balance—$M_{RSC}$ caused by tire blow-out, thus restraining the tendency that the vehicle 100 develops towards a non-stable region. When the vehicle is in a non-stable region after tire blow-out occurs in the left front wheel, at first, a control instruction of controlling drive is sent to the left front wheel, to balance the increasing rolling resistance due to tire blow-out within the shortest time, and prevent the blown-out wheel 101 from sideslip. At this point, the vehicle produces a yaw moment—$M_{RSC}$ caused by tire blow-out of the left front wheel, and the direction thereof is a counterclockwise direction; on the other hand, brake control is implemented on the right rear wheel, to produce a control yaw moment $M_{RSC}$, and the direction thereof is a clockwise direction, thus balancing—$M_{RSC}$ caused by tire blow-out. In another embodiment, the right rear wheel is insufficient to provide a corresponding control yaw torque, it is also necessary to auxiliarily brake the right front wheel and the left rear wheel, such that the right rear wheel, the right front wheel and the left rear wheel jointly produce a control yaw moment $M_{RSC}$, and the direction thereof is a clockwise direction, to balance—$M_{RSC}$ caused by tire blow-out, making the vehicle 100 rapidly enter a stable region to drive. In this embodiment, the size of the torque contributed by each wheel in the right rear wheel, the right front wheel and the left rear wheel may be set according to specific situations based on the principle that the sum of the torques produced by the right rear wheel, the right front wheel and the left rear wheel is equal to the control yaw moment $M_{RSC}$.

Figure 4:
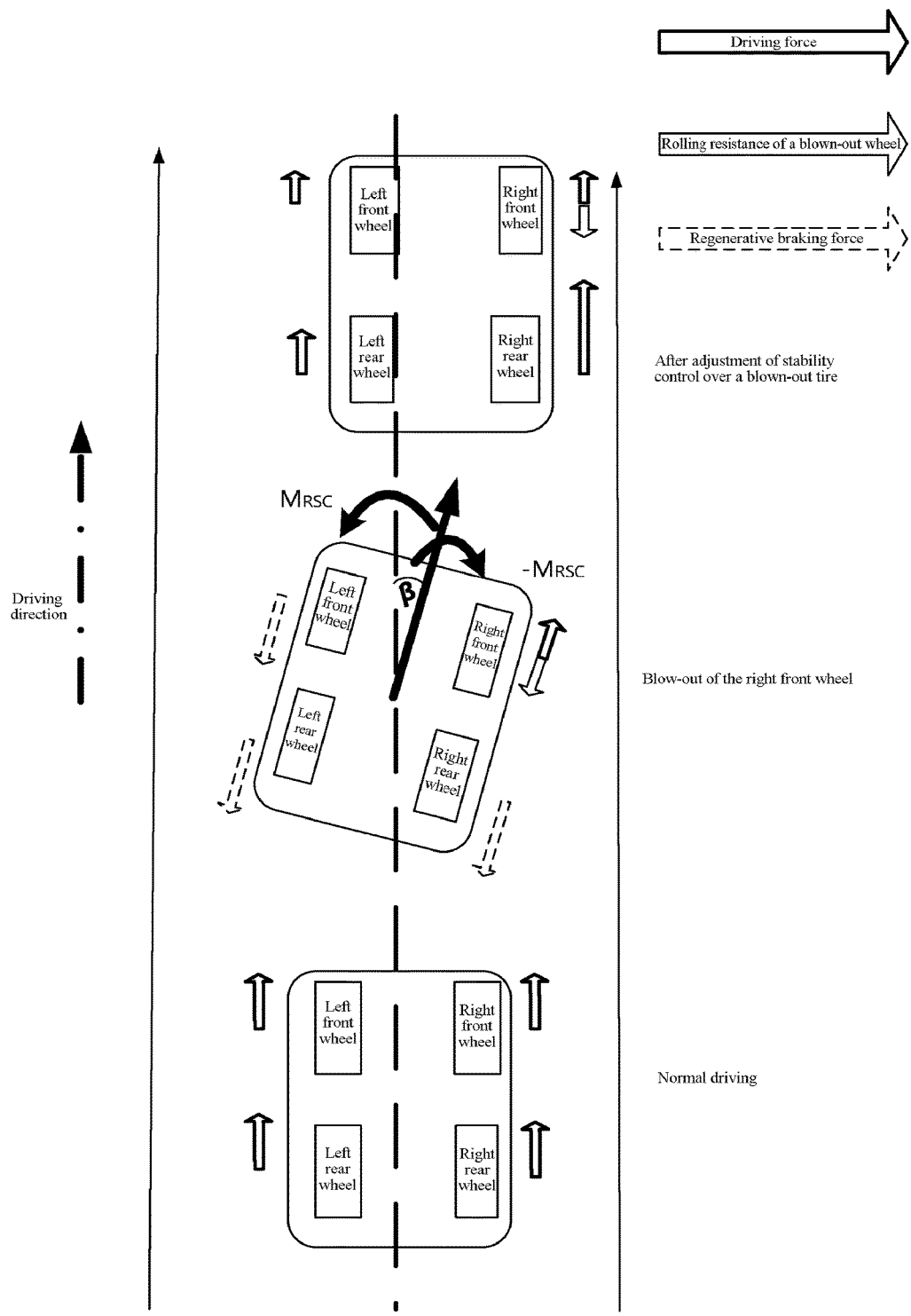
FIG. 4 is a schematic diagram of another application of a vehicle stability control method and system for a four-wheel independent drive vehicle according to an embodiment of the present invention.

Referring to FIG. 4, as another example, during driving of the vehicle 100, the right front wheel suddenly blows out, a tire blow-out signal is transferred to the vehicle controller 10. At the same time, the vehicle controller 10 calculates, in real time, an estimated yaw velocity $\gamma_d$ of the vehicle 100 according to the vehicle condition information parameters collected by the steering wheel angle sensor 41, the wheel speed sensor 44 and the tire pressure sensor 45, compares the estimated yaw velocity $\gamma_d$ with the yaw velocity $\gamma$ measured by the yaw rate sensor 42 to obtain the yaw velocity difference $\Delta\gamma$, and further, estimates a sideslip angle $\beta$ according to the vehicle condition information parameter collected by the wheel speed sensor 44, and calculates the control yaw moment $M_{RSC}$ used to cancel the yaw moment difference between the estimated yaw moment and the actual yaw moment in real time by using the moment of inertia $I_z$. The vehicle stability control module 11 sets the threshold $\gamma 1$ of the yaw velocity difference and the threshold $\beta 1$ of the sideslip angle. When the tire blow-out has just happened, $\Delta\gamma$ and $\beta$ are relatively small, that is, $\Delta\gamma \leq \gamma 1$ and $\beta \leq \beta 1$ are satisfied, the vehicle 100 is in the stable region, the motor 30 of the left front wheel needs to respond and implements brake control on the left front wheel coaxial with the blown-out wheel 101, for balancing the yaw moment difference generated at the beginning of the tire blow-out, and restraining the tendency that the vehicle 100 develops towards a non-stable region. However, if the tendency cannot be restrained, and $\Delta\gamma \geq \gamma 1$ or $\beta \geq \beta 1$ is satisfied, it indicates that the vehicle 100 is going to enter the non-stable region, the vehicle controller 10 sends a stronger control instruction, and will first send a control instruction of controlling drive to the right front wheel, for balancing the increasing rolling resistance due to tire blow-out in the shortest time, and preventing the blown-out wheel 101 from sideslip, and moreover, available yaw moments of the other three wheels 101 in the current vehicle state are calculated according to the vehicle dynamics model and the tire model, to implement brake control. For example, regenerative braking is implemented on the left rear wheel, and if the left rear wheel is insufficient to provide a corresponding recovery yaw moment, it is also necessary to auxiliarily brake the left front wheel and the right rear wheel, making the vehicle 100 rapidly enter the stable region to drive, that is, $\Delta\gamma \leq \gamma 1$ and $\beta \leq \beta 1$. After reaching the stable region, in order to avoid that speed reduction due to braking leads to rear-end collision, the vehicle controller 10 needs to make further analysis to further adjust the torque of the non-blown-out wheel, maintaining the vehicle to stably drive at a fixed speed. As shown in FIG. 4, during straight driving of the vehicle, influences of a steering system on the vehicle are not considered. After tire blow-out occurs in the right front wheel, the vehicle produces a yaw moment—$M_{RSC}$ caused by tire blow-out of the right front wheel, which is specifically a yaw moment difference between an estimated yaw moment and an actual yaw moment, the direction thereof is a clockwise direction, and at least one of the motors corresponding to the remaining three wheels produces a control yaw moment $M_{RSC}$, and the direction thereof is a counterclockwise direction, used to balance the yaw moment—$M_{RSC}$ caused by tire blow-out of the right front wheel. For example, when the vehicle is in a stable region after tire blow-out occurs in the right front wheel, the vehicle produces a yaw moment—$M_{RSC}$ caused by tire blow-out of the right front wheel, the direction thereof is a clockwise direction, the motor 30 of the left front wheel implements brake control on the left front wheel coaxial with the blown-out wheel, to produce a control yaw moment $M_{RSC}$, and the direction thereof is a counterclockwise direction, to balance—$M_{RSC}$ caused by tire blow-out, thus restraining the tendency that the vehicle 100 develops towards a non-stable region. When the vehicle is in a non-stable region after tire blow-out occurs in the right front wheel, at first, a control instruction of controlling drive is sent to the right front wheel, to balance the increasing rolling resistance due to tire blow-out within the shortest time, and prevent the blown-out wheel from sideslip. At this point, the vehicle produces a yaw moment—$M_{RSC}$ caused by tire blow-out of the right front wheel, and the direction thereof is a clockwise direction; on the other hand, brake control is implemented on the left rear wheel, to produce a control yaw moment $M_{RSC}$, and the direction thereof is a counterclockwise direction, thus balancing—$M_{RSC}$ caused by tire blow-out. In another embodiment, the left rear wheel is insufficient to provide a corresponding control yaw torque, it is also necessary to auxiliarily brake the left front wheel and the right rear wheel, such that braking forces of the right rear wheel, the left front wheel and the left rear wheel jointly produce a control yaw moment $M_{RSC}$, and the direction thereof is a counterclockwise direction, to balance—$M_{RSC}$ caused by tire blow-out, making the vehicle 100 rapidly enter a stable region to drive. In this embodiment, the size of the torque contributed by each wheel in the right rear wheel, the left front wheel and the left rear wheel may be set according to specific situations based on the principle that the sum of the torques produced by the right rear wheel, the left front wheel and the left rear wheel is equal to the control yaw moment $M_{RSC}$.

Figure 5:
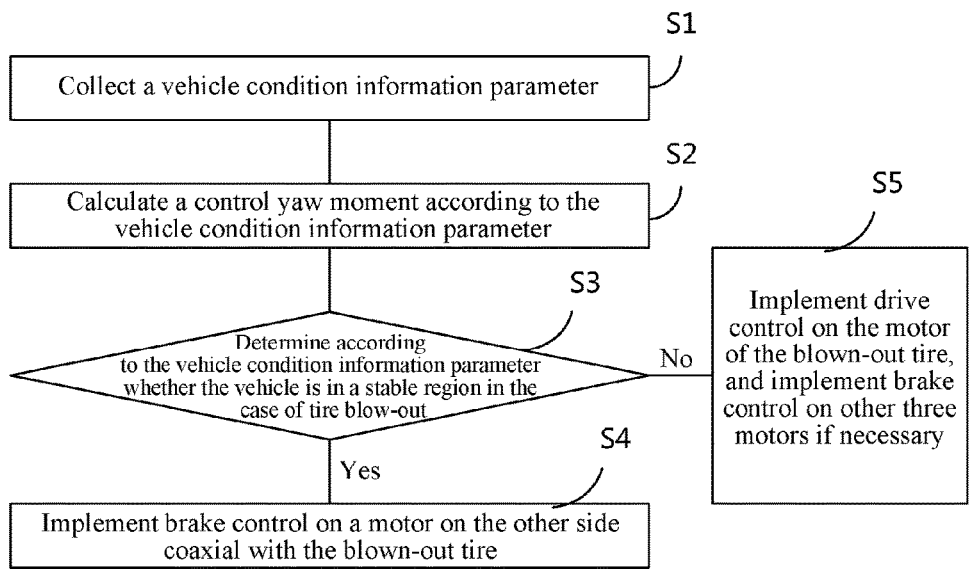
FIG. 5 is a flowchart of a vehicle stability control method for a four-wheel independent drive vehicle according to an embodiment of the present invention.

Referring to FIG. 5, a vehicle stability control method for a four-wheel independent drive vehicle according to a preferred embodiment of the present invention can be implemented by a vehicle stability control system and is applied to vehicles. The vehicle stability control method includes following steps.

At step S1, a vehicle condition information parameter of a vehicle 100 is collected. Specifically, it may collect a tire pressure, a longitudinal acceleration, a transverse acceleration, a yaw velocity, a steering wheel angle and a wheel speed of a tire of a wheel 101.

At step S2, a control yaw moment is calculated according to the vehicle condition information parameter, the control yaw moment being equal to a yaw moment difference between an estimated yaw moment and an actual yaw moment of the vehicle 100. Specifically, the control yaw moment may be calculated according to the tire pressure, the longitudinal acceleration, the transverse acceleration, the steering wheel angle, the wheel speed and the yaw velocity.

At step S3, it is determined whether the vehicle 100 is in a stable region according to the vehicle condition information parameter in the case of tire blow-out. Specifically, it may be determined whether the vehicle 100 is in a stable region according to the yaw velocity, the steering wheel angle, the wheel speed and the tire pressure.

At step S4, if the vehicle 100 is in the stable region, brake control is implemented on a motor 30 corresponding to a wheel 101 on the other side coaxial with the blown-out wheel 101, so as to produce the control yaw moment.

At step S5, if the vehicle 100 is in the non-stable region, drive control is implemented on a motor 30 corresponding to the blown-out wheel 101, and brake control is implemented on motors 30 corresponding to other three wheels 101, so as to produce the control yaw moment.

In some embodiments, the control yaw moment is calculated according to the formula of $$M_{RSC} = -l_f F_{yf} \cos \delta_f + l_r F_{yr} + I_z(\dot{\gamma}_d - \zeta(\dot{\beta} - \dot{\beta}_d));$$

Where $M_{RSC}$ is the control yaw moment; $l_f$ and $l_r$ are distances from a front shaft and a rear shaft of the vehicle 100 to the mass center of the vehicle respectively; $F_{yf}$ and $F_{yr}$ are lateral forces applied to front wheels and rear wheels of the vehicle 100 respectively, and meet equations of $$F_{yf} = k_f \alpha_f = k_f \left( \delta_f - \frac{v_y - l_f \gamma}{v_x} \right); \text{ and}$$

$$F_{yr} = k_r \alpha_r = k_r \left( \delta_r - \frac{v_y - l_r \gamma}{v_x} \right);$$

where $k_f$ and $k_r$ are cornering stiffness of the front shaft and the rear shaft of the vehicle 100 respectively, and deduced from the tire pressure; $\alpha_f$ and $\alpha_r$ are accelerations of the front wheels and the rear wheels of the vehicle 100 respectively, and are obtained according to the transverse acceleration and the longitudinal acceleration; $\delta_f$ and $\delta_r$ are turning angles of the front wheels and the rear wheels of the vehicle 100 respectively, and are obtained according to the steering wheel angle; $v_x$ and $v_y$ are transverse speed and longitudinal speed of the vehicle 100 respectively, and are obtained according to the wheel speed; $\gamma$ is the yaw velocity; $I_z$ is moment of inertia of the vehicle around the axis Z; $\dot{\gamma}_d$ is a derivative of an estimated yaw velocity, that is, an estimated yaw acceleration, and $$\gamma_d = \frac{\delta_r * v_x / L}{1 + K * v_x^2};$$

where L is a distance between the front shaft and the rear shaft of the vehicle 100; K is a stability factor, $$K = \frac{m}{L^2} \left( \frac{l_f}{k_r} - \frac{l_r}{k_f} \right);$$

where m is the mass of the vehicle 100; $\zeta$ is a constant; $\dot{\beta}$ is a derivative of a sideslip angle, and the sideslip angle $\beta$ is obtained from the wheel speed; $\dot{\beta}_d$ is a derivative of an estimated sideslip angle, and $$\beta_d = \frac{l_r - m * l_f * v_x^2 / (k_r * L)}{L(1 + K v_x^2)} \delta_f.$$

In some embodiments, the vehicle controller determines whether $\Delta \gamma \leq \gamma 1$ and $\beta \leq \beta 1$ are satisfied, if $\Delta \gamma \leq \gamma 1$ and $\beta \leq \beta 1$ are satisfied, the vehicle is in the stable region; if $\Delta \gamma \geq \gamma 1$ or $\beta \geq \beta 1$ is satisfied, the vehicle 100 is in the non-stable region, in which $\Delta \gamma$ is a difference between the yaw velocity and an estimated yaw velocity; and the estimated yaw velocity is calculated according to the formula of $$\gamma_d = \frac{\delta_r * v_x / L}{1 + K * v_x^2};$$

where $\gamma_d$ is the estimated yaw velocity, $\delta_f$ is a turning angle of the front wheels of the vehicle and deduced from the steering wheel angle; $v_x$ is a transverse speed of the vehicle 100 and deduced from the wheel speed; L is a distance between a front shaft and a rear shaft of the vehicle 100; K is a stability factor, and $$K = \frac{m}{L^2}\left(\frac{l_f}{k_r} - \frac{l_r}{k_f}\right);$$

where m is the mass of the vehicle; $l_f$ and $l_r$ are distances from the front shaft and the rear shaft of the vehicle 100 to the mass center of the vehicle 100 respectively; $k_f$ and $k_r$ are cornering stiffness of the front shaft and the rear shaft of the vehicle 100 respectively and deduced from the tire pressure; β is a sideslip angle and deduced from the wheel speed; γ1 is a threshold of the yaw velocity difference, and β1 is a threshold of the sideslip angle.

The vehicle stability control method and system in embodiments of the present invention use rapid response and regenerative brake characteristics of the motor to replace a hydraulic brake system with complicated system, slow response and high cost, thus achieving simplifying the system, making rapid response and reducing the cost.

Reference can be made to corresponding parts of the vehicle stability control system in the above embodiment for other parts not expanded in the vehicle control method in this embodiment, which are not detailed herein.

In the description of the specification, the reference term "an embodiment," "some embodiments," "one embodiment", "schematic example," "an example," "a specific example," or "some examples," means that a particular feature, structure, material, or characteristic described in connection with the embodiment or example is included in at least one embodiment or example of the present invention. Thus, the schematic expressions of the terms are not necessarily referring to the same embodiment or example of the present invention. Furthermore, the particular features, structures, materials, or characteristics may be combined in any suitable manner in one or more embodiments or examples.

Any process or method in the flow chart or described herein in other manners can be understood as indicating modules, fragments or parts of codes that include one or more executable instructions configured to implement a specific logical function or process steps, and the scope of preferred implementation manners of the present invention includes other implementations, in which the functions can be executed not in an order illustrated or discussed, including in a basically simultaneous manner in accordance with the functions involved or in a reverse order, which should be understood by those skilled in the art of the embodiments of the present invention.

Logics and/or steps expressed in the flow chart or described herein in other manners, for example, can be considered to be a sequencing list of executable instructions configured to implement logical functions, and can be specifically implemented in any computer readable medium, to be used by an instruction executing system, apparatus or device (for example, a computer based system, a system including a processor or another system that can read an instruction from the instruction executing system, apparatus or device and execute the instruction), or used in combination with the instruction executing systems, apparatuses or devices. In terms of the specification, the "computer readable medium" may be any apparatus that can include, store, communicate, propagate or transmit a program to be used by the instruction executing systems, apparatuses or devices or used in combination with the instruction executing systems, apparatuses or devices. A more specific example (non-exhaustive list) of the computer readable medium includes the following: an electrical connecting portion (electronic apparatus) having one or more wires, a portable computer disk box (magnetic apparatus), a random access memory (RAM), a read only memory (ROM), an erasable programmable read only memory (EPROM or a flash memory), an optical fiber apparatus, and a portable compact disc read only memory (CDROM). In addition, the computer readable medium may even be a piece of paper on which the program can be printed or another suitable medium, because the program can be obtained in an electronic manner, for example, by performing optical scanning on the paper or another medium and then editing, decoding or, if necessary, processing it in other suitable manners, which is then stored in a computer memory.

It should be understood that various parts of the present invention can be implemented with hardware, software, firmware or their combinations. In the foregoing implementation manners, multiple steps or methods can be implemented by software or firmware which is stored in a memory and executed by a suitable instruction executing system. For example, if the steps or methods are implemented with hardware, like in another implementation manner, implementation can be completed by using any one of the following technologies well known in the art or their combinations: a discrete logic circuit which has a logic gate circuit configured to implement a logical function on a data signal, a specific integrated circuit which has a suitable combinational logic gate circuit, a programmable gate array (PGA), a field programmable gate array (FPGA) and so on.

Those of ordinary skill in the art can understand that implementation of all or some steps carried in the method of the foregoing embodiments can be completed by a program instructing relevant hardware, the program can be stored in a computer readable medium, and the program, when being executed, includes one of the steps of the method embodiment or a combination thereof.

In addition, the functional units in the various embodiments of the present invention may be integrated into one processing module, or each of the units may exist alone physically, or two or more units may be integrated into one module. The integrated module may be implemented in the form of hardware, or may be implemented in the form of a software functional module. The integrated module may also be stored in a computer readable storage medium if implemented in the form of a software functional module and sold or used as a separate product.

The storage medium mentioned above may be a read only memory, a magnetic disk, an optical disc, or the like. Although the embodiments of the present invention have been illustrated and described above, it can be understood that the embodiments are exemplary and cannot be understood as limitations to the present invention, and those of ordinary skill in the art can change, modify, replace and transform the embodiments within the scope of the present invention.

What is claimed is:

1. A vehicle stability control system, comprising:
   motors coupled with four wheels of a vehicle respectively;
   motor controllers connected with the motors respectively;
   a tire pressure sensor configured to collect a tire pressure of at least one wheel of the vehicle;
   an information collection module, configured to collect a vehicle condition information parameter of the vehicle comprising at least a tire pressure received from the tire pressure sensor; and
   a vehicle controller, connected with the motor controllers and the information collection module respectively, and configured to obtain a control yaw moment according to the vehicle condition information parameter, wherein the control yaw moment is equal to a yaw moment difference between an estimated yaw moment and an actual yaw moment of the vehicle, wherein the vehicle controller is further configured to:

detect a tire blow-out by monitoring tire pressure;

determine whether the vehicle is in a stable operating region in the case of tire blow-out by determining if the yaw control movement is below a yaw velocity threshold value and a sideslip angle is below a sideslip angle threshold value;

implement brake control on the motor corresponding to the wheel on the other side coaxial with the wheel with tire blow-out when the vehicle is in the stable operating region, so as to produce the control yaw moment; and implement drive control on the motor corresponding to the wheel with tire blow-out and implement brake control on the motor corresponding to at least one of the other three wheels when the vehicle is in a non-stable operating region indicated by a yaw control movement greater than the yaw velocity threshold or the sideslip angle is greater than the sideslip angle threshold value, so as to produce the control yaw moment less than the yaw velocity threshold.

2. The vehicle stability control system according to claim 1, wherein the information collection module further comprises:

a yaw rate sensor, configured to collect a longitudinal acceleration, a transverse acceleration and a yaw velocity of the vehicle;

a steering wheel angle sensor, configured to collect a steering wheel angle of the vehicle; and a wheel speed sensor, configured to collect a wheel speed of the vehicle.

3. The vehicle stability control system according to claim 2, wherein the vehicle controller is configured to calculate the control yaw moment according to the tire pressure, the longitudinal acceleration, the transverse acceleration, the steering wheel angle, the wheel speed and the yaw velocity.

4. The vehicle stability control system according to claim 3, wherein the vehicle controller is configured to calculate the control yaw moment according to a formula of $$M_{RSC} = -l_f F_{yf} \cos \delta_f + l_r F_{yr} + I_z(\dot{\gamma}_d - \zeta(\dot{\beta} - \dot{\beta}_d)),$$

where $M_{RSC}$ is the control yaw moment; $l_f$ and $l_r$ are distances from a front shaft and a rear shaft of the vehicle to a mass center of the vehicle respectively; $F_{yf}$ and $F_{yr}$ are lateral forces applied to front wheels and rear wheels of the vehicle respectively, and meet equations of $$F_{yf} = k_f \alpha_f = k_f \left( \delta_f - \frac{v_y - l_f \gamma}{v_x} \right); \text{ and}$$

$$F_{yr} = k_r \alpha_r = k_r \left( \delta_r - \frac{v_y - l_r \gamma}{v_x} \right),$$

where $k_f$ and $k_r$ are cornering stiffness of the front shaft and the rear shaft of the vehicle respectively, and deduced from the tire pressure; $\alpha_f$ and $\alpha_r$ are accelerations of the front wheels and the rear wheels of the vehicle respectively, and are obtained according to the transverse acceleration and the longitudinal acceleration; $\delta_f$ and $\delta_r$ are turning angles of the front wheels and the rear wheels of the vehicle respectively, and are obtained according to the steering wheel angle; $v_x$ and $v_y$ are transverse speed and longitudinal speed of the vehicle respectively, and are obtained according to the wheel speed; $\gamma$ is the yaw velocity; $I_z$ is moment of inertia of the vehicle around the axis Z; $\gamma_d$ is a derivative of an estimated yaw velocity, and $$\gamma_d = \frac{\delta_r * v_x / L}{1 + K * v_x^2};$$

where L is a distance between the front shaft and the rear shaft of the vehicle; K is a stability factor, $$K = \frac{m}{L^2} \left( \frac{l_f}{k_r} - \frac{l_r}{k_f} \right);$$

where m is the mass of the vehicle; $\zeta$ is a constant; $\dot{\beta}$ is a derivative of a sideslip angle, and the sideslip angle $\beta$ is obtained from the wheel speed; $\dot{\beta}_d$ is a derivative of an estimated sideslip angle, and $$\beta_d = \frac{l_r - m * l_f * v_x^2 / (k_r * L)}{L(1 + K v_x^2)} \delta_f.$$

5. The vehicle stability control system according to claim 2, wherein the vehicle controller is configured to determine whether the vehicle is in the stable operating region according to the yaw velocity threshold, the steering wheel angle, the wheel speed and the tire pressure.

6. The vehicle stability control system according to claim 1, wherein, if the left front wheel is with tire blow-out and the vehicle is in the stable operating region, the vehicle controller is configured to implement brake control on the right front wheel, so as to produce the control yaw moment.

7. The vehicle stability control system according to claim 1, wherein, if the left front wheel is with tire blow-out and the vehicle is in the non-stable operating region, the vehicle controller is configured to implement drive control on the left front wheel and implement brake control on the right rear wheel, and to implement brake control on the right front wheel and the left rear wheel if the control yaw moment is not produced by implementing drive control on the left front wheel and implementing brake control on the right rear wheel.

8. The vehicle stability control system according to claim 1, wherein, if the right front wheel is with tire blow-out and the vehicle is in the stable operating region, the vehicle controller is configured to implement brake control on the left front wheel so as to produce the control yaw moment.

9. The vehicle stability control system according to claim 1, wherein, if the right front wheel is with tire blow-out and the vehicle is in the non-stable operating region, the vehicle controller is configured to implement drive control on the right front wheel and implement brake control on the left rear wheel, and to implement brake control on the left front wheel and the right rear wheel if the control yaw moment is not produced by implementing drive control on the right front wheel and implementing brake control on the left rear wheel.

10. A vehicle stability control method, comprising:
collecting a vehicle condition information parameter of a vehicle comprising at least a tire pressure of at least one wheel of the vehicle;
obtaining a control yaw moment according to the vehicle condition information parameter of the vehicle, wherein the control yaw moment is equal to a yaw moment difference between an estimated yaw moment and an actual yaw moment of the vehicle;
detecting a blow-out of at least one tire;
determining whether the vehicle is in a stable operating region in the case of tire blow-out by determining if the yaw control movement is below a yaw velocity threshold value and a sideslip angle is below a sideslip angle threshold value;
if the vehicle is in the stable operating region, implementing brake control on a motor corresponding to a wheel on the other side coaxial with a wheel with tire blow-out so as to produce the control yaw moment; and
if the vehicle is in a non-stable operating region, indicated by a yaw control movement greater than the yaw velocity threshold or the sideslip angle is greater than the sideslip angle threshold value, implementing drive control on a motor corresponding to the wheel with tire blow-out and implementing brake control on a motor corresponding to at least one of other three wheels, so as to produce the control yaw moment.

11. The vehicle stability control method according to claim 10, wherein the step of collecting a vehicle condition information parameter of a vehicle further comprises:
a longitudinal acceleration, a transverse acceleration, a yaw velocity, a steering wheel angle and a wheel speed of the vehicle.

12. The vehicle stability control method according to claim 11, wherein the step of obtaining a control yaw moment according to the vehicle condition information parameter of the vehicle comprises:
calculating the control yaw moment according to the tire pressure, the longitudinal acceleration, the transverse acceleration, the steering wheel angle, the wheel speed and the yaw velocity.

13. The vehicle stability control method according to claim 12, wherein the control yaw moment is calculated according to a formula of $$M_{RSC} = -l_f F_{yf} \cos \delta_f + l_r F_{yr} + I_z(\dot{\gamma}_d - \zeta(\dot{\beta} - \dot{\beta}_d));$$

where $M_{RSC}$ is the control yaw moment; $l_f$ and $l_r$ are distances from a front shaft and a rear shaft of the vehicle to a mass center of the vehicle respectively; $F_{yf}$ and $F_{yr}$ are lateral forces applied to front wheels and rear wheels of the vehicle respectively, and meet equations of $$F_{yf} = k_f \alpha_f = k_f \left( \delta_f - \frac{v_y - l_f \gamma}{v_x} \right); \text{ and}$$

$$F_{yr} = k_r \alpha_r = k_r \left( \delta_r - \frac{v_y - l_r \gamma}{v_x} \right),$$

where $k_f$ and $k_r$ are cornering stiffness of the front shaft and the rear shaft of the vehicle respectively, and deduced from the tire pressure; $\alpha_f$ and $\alpha_r$ are accelerations of the front wheels and the rear wheels of the vehicle respectively, and are obtained according to the transverse acceleration and the longitudinal acceleration; $\delta_f$ and $\delta_r$ are turning angles of the front wheels and the rear wheels of the vehicle respectively, and are obtained according to the steering wheel angle; $v_x$ and $v_y$ are transverse speed and longitudinal speed of the vehicle respectively, and are obtained according to the wheel speed; $\gamma$ is the yaw velocity; $I_z$ is moment of inertia of the vehicle around the axis Z; $\gamma_d$ is a derivative of an estimated yaw velocity, and $$\gamma_d = \frac{\delta_r * v_x / L}{1 + K * v_x^2};$$

where L is a distance between the front shaft and the rear shaft of the vehicle; K is a stability factor, $$K = \frac{m}{L^2} \left( \frac{l_f}{k_r} - \frac{l_r}{k_f} \right);$$

where m is the mass of the vehicle; $\zeta$ is a constant; $\dot{\beta}$ is a derivative of a sideslip angle, and the sideslip angle $\beta$ is obtained from the wheel speed; $\dot{\beta}_d$ is a derivative of an estimated sideslip angle, and $$\beta_d = \frac{l_r - m * l_f * v_x^2 / (k_r * L)}{L(1 + K v_x^2)} \delta_f.$$

14. The vehicle stability control method according to claim 11, wherein the step of determining whether the vehicle is in a stable operating region in the case of tire blow-out according to the vehicle condition information parameter comprises:
determining whether the vehicle is in the stable operating region according to the yaw velocity, the steering wheel angle, the wheel speed and the tire pressure.

15. The vehicle stability control method according to claim 14, wherein if $\Delta\gamma \leq \gamma 1$ and $\beta \leq \beta 1$ are satisfied, the vehicle is in the stable operating region; if $\Delta\gamma > \gamma 1$ and $\beta > \beta 1$ is satisfied, the vehicle is in the non-stable operating region; in which $\Delta\gamma$ is a difference between the yaw velocity and an estimated yaw velocity; and the estimated yaw velocity is calculated according to a formula of $$\gamma_d = \frac{\delta_r * v_x / L}{1 + K * v_x^2};$$

where $\gamma_d$ is the estimated yaw velocity, $\delta_f$ is a turning angle of the front wheels of the vehicle and deduced from the steering wheel angle; $v_x$ is a transverse speed of the vehicle and deduced from the wheel speed; L is a distance between a front shaft and a rear shaft of the vehicle; K is a stability factor, and $$K = \frac{m}{L^2} \left( \frac{l_f}{k_r} - \frac{l_r}{k_f} \right);$$

where m is the mass of the vehicle; $l_f$ and $l_r$ are distances from the front shaft and the rear shaft of the vehicle to the mass center of the vehicle respectively; $k_f$ and $k_r$ are cornering stiffness of the front shaft and the rear shaft of the vehicle respectively and deduced from the tire pressure; β is a sideslip angle and deduced from the wheel speed; γ1 is a threshold of the yaw velocity difference, and β1 is a threshold of the sideslip angle.

16. The vehicle stability control method according to claim 10, wherein, if the left front wheel is with tire blow-out and the vehicle is in the stable operating region, brake control is implemented on the right front wheel so as to produce the control yaw moment.

17. The vehicle stability control method according to claim 10, wherein, if the left front wheel is with tire blow-out and the vehicle is in the non-stable operating region, drive control is implemented on the left front wheel and brake control is implemented on the right rear wheel; and if the control yaw moment is not produced by implementing the drive control on the left front wheel and implementing brake control on the right rear wheel, brake control is implemented on the right front wheel and the left rear wheel.

18. The vehicle stability control method according to claim 10, wherein, if the right front wheel is with tire blow-out and the vehicle is in the stable operating region, brake control is implemented on the left front wheel so as to produce the control yaw moment.

19. The vehicle stability control method according to claim 10, wherein, if the right front wheel is with tire blow-out and the vehicle is in the non-stable operating region, drive control is implemented on the right front wheel and brake control is implemented on the left rear wheel; and if the control yaw moment is not produced by implementing drive control on the right front wheel and implementing brake control on the left rear wheel, brake control is implemented on the left front wheel and the right rear wheel.

20. A vehicle, comprising:
four wheels; and
a vehicle stability control system, comprising:
motors coupled with four wheels of a vehicle respectively;
motor controllers connected with the motors respectively;
a tire pressure sensor configured to collect a tire pressure of at least one wheel of the vehicle;
an information collection module, configured to collect a vehicle condition information parameter of the vehicle comprising at least a tire pressure received from the tire pressure sensor; and
a vehicle controller, connected with the motor controllers and the information collection module respectively, and configured to obtain a control yaw moment according to the vehicle condition information parameter, wherein the control yaw moment is equal to a yaw moment difference between an estimated yaw moment and an actual yaw moment of the vehicle,
detecting a blow-out of at least one tire;
wherein the vehicle controller is further configured to:
determine whether the vehicle is in a stable operating region in the case of tire blow-out by determining if the yaw control movement is below a yaw velocity threshold value and a sideslip angle is below a sideslip angle threshold value;
implement brake control on the motor corresponding to the wheel on the other side coaxial with the wheel with tire blow-out when the vehicle is in the stable operating region, so as to produce the control yaw moment; and
implement drive control on the motor corresponding to the wheel with tire blow-out and implement brake control on the motor corresponding to at least one of the other three wheels when the vehicle is in a non-stable operating region, so as to produce the control yaw moment.

* * * * *